United States Patent [19]
Ritsema

[11] Patent Number: 4,583,623
[45] Date of Patent: Apr. 22, 1986

[54] HEAT SHIELD ELEMENT FOR A BRAKE

[75] Inventor: Irving R. Ritsema, South Bend, Ind.

[73] Assignee: Allied Corporation, Morristown, N.J.

[21] Appl. No.: 662,107

[22] Filed: Oct. 18, 1984

[51] Int. Cl.⁴ .............................................. F16D 65/84
[52] U.S. Cl. .................. 188/264 G; 188/71.6
[58] Field of Search ................ 92/168, 248; 188/71.6, 188/264 G

[56] References Cited

U.S. PATENT DOCUMENTS

| | | | |
|---|---|---|---|
| 3,592,303 | 7/1971 | Tincher | 188/264 |
| 4,431,090 | 2/1984 | Kinoshita | 188/264 G |
| 4,513,844 | 4/1985 | Hoffman | 188/71.6 |

FOREIGN PATENT DOCUMENTS 2,134,940 9/1978 Fed. Rep. of Germany.

Primary Examiner—Duane A. Reger
Attorney, Agent, or Firm—Larry J. Palguta; Ken C. Decker

[57] ABSTRACT

The present invention comprises a heat shield element (60) having a central opening (62) for receiving the reduced diameter portion (40) of a piston (16) of a disc brake (10). The heat shield element (60) is disposed between a metallic retainer ring/heat shield (50) and the convolutions of a flexible boot seal (30). The retainer ring/heat shield (50) maintains the axial position of the heat shield element (60) and a bead (36) of the boot seal (30), such that the heat shield element (60), which extends radially outwardly of the retainer (50), provides effective shielding of the boot (30).

7 Claims, 3 Drawing Figures

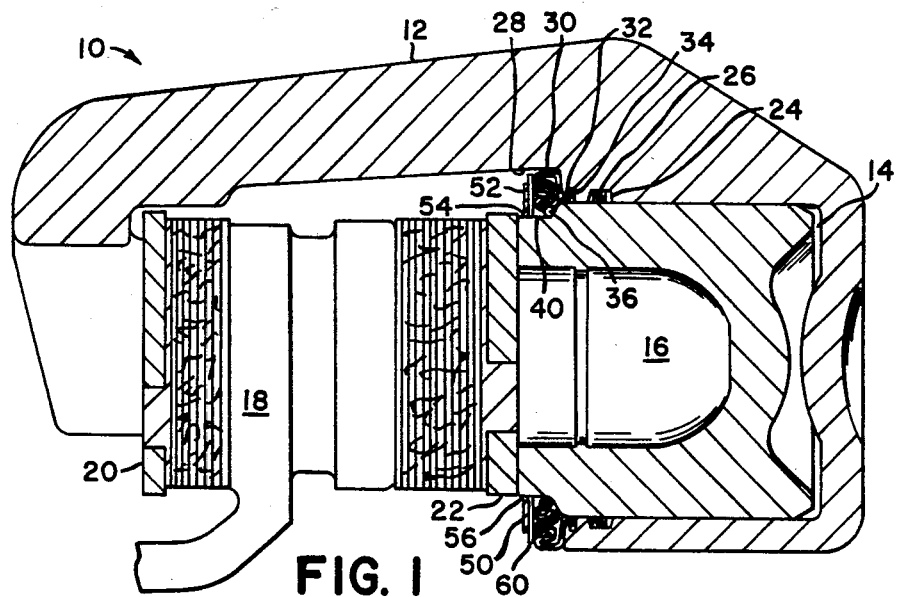
FIG. 1
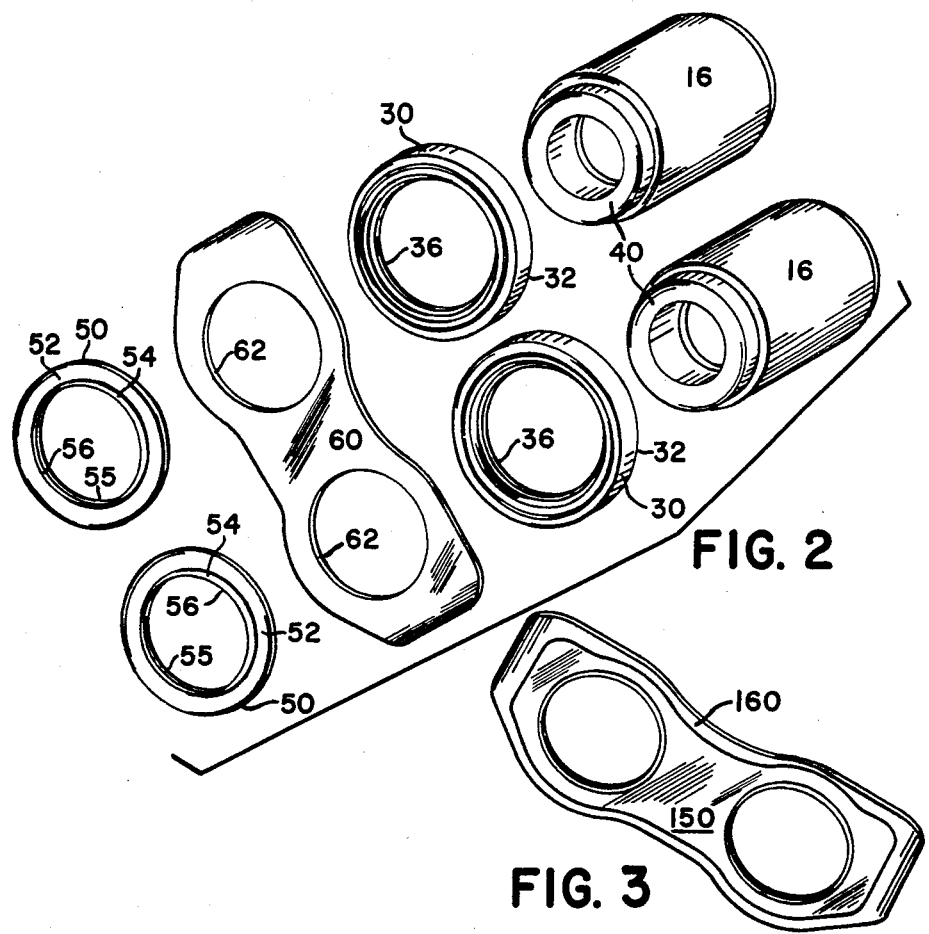
FIG. 2
FIG. 3

HEAT SHIELD ELEMENT FOR A BRAKE

This invention relates to an improved heat shield element for a brake, particularly a disc brake assembly.

The prior art has provided numerous examples of heat shields for disc brake assemblies. Some of these heat shields comprise insulators which engage directly the friction element to provide a heat sink for receiving thermal energy, structures that are fixedly mounted to the housing of the caliper, and structural elements that are attached to the flexible boot seal. An example of one heat shield is Thioux U.S. Pat. No. 4,085,828 issued Apr. 25, 1978, wherein a heat shield covers one side of the inner friction element. In order to restrict heat transfer to the piston and boot seal, a layer of insulation is disposed between the friction element and heat shield, and the heat shield is mounted between the friction element and piston.

With the emphasis upon lighter weight automotive equipment and components in order to improve the mileage of automotive vehicles, many disc brake assemblies include plastic pistons. Plastic pistons are utilized in both automotive and truck disc brake assemblies, particularly in disc brake assemblies utilizing dual pistons. It has been found that it is more economical to form the piston without a boot receiving groove machined in a reduced diameter portion of the piston. The elimination of the boot receiving groove not only makes the piston more inexpensive, but makes manufacture substantially easier. As a result, the bead of the flexible boot seal which engages the reduced diameter portion of the piston, must be maintained at a distance from the friction element which the end of the piston engages. In order to keep the boot seal and bead spaced from the friction element, and thus protect the boot seal from heat dissipated by the friction element, there has been provided a metallic retainer ring/heat shield as disclosed in U.S. application Ser. No. 432,591 filed Oct. 4, 1982, now U.S. Pat. No. 4,527,672, and assigned to the same assignee as herein. This metallic retainer ring/heat shield has a central opening with the portion of the retainer ring about the central opening angled to provide for force fitting of the retainer ring over the reduced diameter portion of the piston. The ring is force fittedly mounted on the reduced diameter portion of the piston, and provides both a heat shield and means for maintaining the axial position of the boot seal, particularly the axially outer bead, during operation and use of the disc brake assembly. However, the retainer ring is metallic, and even though the retainer ring is positioned at a distance from the friction element in order to provide for air flow and insulation from the friction element, some thermal energy dissipated by the friction element is transferred by the retainer ring to the boot seal. It is desirable to provide a heat shield element for utilization in the above brake assembly, and which will provide improved protection of the flexible boot seal and yet comprise a simple, efficient and low cost heat shield.

The present invention comprises a light weight, flexible heat shield element that is mounted about the reduced diameter portion of the piston and disposed between the radially extending portion of the retainer ring and the flexible boot seal. The heat shield element extends radially outwardly from the radial outermost portion of the retainer ring to effectively insulate the boot seal from thermal energy dissipated by the friction element. The heat shield element enables the utilization of a plastic piston not having a boot seal bead groove, and the use of the low cost metal retainer ring, in order to provide a low cost disc brake assembly and extended wear-life boot seal. The retainer ring and heat shield element may comprise a single structure with the heat shield element fixedly mounted to the back of the retainer ring so that each is mounted simultaneously on the reduced diameter portion of the piston.

The present invention will now be explained with reference to the accompanying drawings wherein:

FIG. 1 illustrates a cross section view of a dual piston disc brake assembly utilizing the heat shield element of the invention;

FIG. 2 is an exploded view of the retaining rings, heat shield element, boot seals, and pistons illustrated in the disc brake assembly of FIG. 1; and FIG. 3 illustrates a heat shield element and retaining ring subassembly in accordance with the invention.

Referring to FIGS. 1 and 2, the disc brake 10 comprises a caliper 12 with an axially extending bore 14 receiving a piston 16. The caliper 12 extends over the top of a rotor 18, one side of the caliper supporting a friction element 20. A friction element 22 is disposed adjacent the rotor 18 and engaged by piston 16. As is well known in the art, the caliper housing 12 includes a groove 24 receiving a retraction seal 26 and has an enlarged diameter portion 28 for receiving a flexible boot seal 30. Housing groove 32 receives the bead 34 of boot seal 30, and bead 36 engages a reduced diameter 40 of piston 16. When the disc brake assembly is actuated by the communication of pressurized fluid to bore 14, the piston 16 extends axially to cause friction element 22 to engage frictionally the spinning rotor 18, and reaction forces cause the caliper 12 to move axially so that friction element 20 engages the other side of the rotor. Engagement of friction elements 20, 22 with rotor 18 retards the motion of the rotor 18 and generates thermal energy which is dissipated to the surrounding environment including the piston 16, housing 12, and seals 26 and 30.

In order to protect flexible boot seal 30 from the thermal energy dissipated by the friction elements, a retainer ring/heat shield 50 is attached to the reduced diameter portion 40 of piston 16. The heat shield 50 includes a first portion 52 extending radially outwardy from the piston to form a partial boundary for maintaining the bead 36 in axial position relative to the reduced diameter portion 4 of piston 16, and a second portion 54 extends angularly relative to the first portion to terminate at edge circumference 56 of interior opening 55 press fitted about the reduced diameter portion 40 of the piston. The retainer ring/heat shield 50 is fully described and disclosed in U.S. application Ser. No. 432,591 filed Oct. 4, 1982, U.S. Pat. No. 4,527,672, and which is incorporated by reference herein.

The retainer ring/heat shield 50 includes an edge circumference 56 which provides a gripping surface that engages the reduced diameter portion 40 of the piston 16. The edge circumference not only serves to mount the retainer ring upon the piston, but the edge engagement provides for minimal surface-to-surface engagement between the two parts and thereby minimizes the amount of thermal energy that can be transfered from the retainer ring/heat shield to the piston. The retainer ring is typically a metal structure, and thus some heat dissipated by the friction elements is received by the retainer ring and transfered to the flexible boot seal 30. In order to minimize as much as possible the amount of thermal energy transferred by the friction elements to the boot seal, and to eliminate any possibility of the boot seal 30 being damaged or fatigued by such heat, there is provided the light weight, flexible heat shield element 60 of the present invention. The heat shield element comprises a flexible material having a central opening 62 of approximately the diameter of the reduced portion 40 of piston 16, and which is fitted over portion 40 so that central opening 62 is coaxial with interior opening 55 of retainer ring 50. Heat shield element 60 is disposed between retainer ring 50 and flexible boot 30, retainer ring 50 maintaining the axial position of the heat shield element relative to the piston 16. Flexible heat shield element 60 extends radially outwardly beyond the radially outermost extension of first porton 52 in order to provide almost complete shielding and insulation of flexible boot seal 30. The heat shield element may comprise any one of several non-metallic materials which provide suitable insulation and shielding for boot seal 30, such as a flexible material known as Thermotork 9001 manufactured by Armstrong, or a ceramic material known as Ceratex R and manufactured by the assignee herein. Such materials provide an easily manufactured and mounted insulator material which effectively shields the flexible boot seal from thermal energy in excess of 360° C. Element 60 is maintained in position by retainer ring 50 which remains spaced apart from the friction element in order to provide a thermally insulating layer of air between the retainer ring and friction element.

The heat shield element of the present invention has been tested in order to determine its effectiveness. It has been found that the heat shield element effectively shields the boot seal from exceedingly large amounts of thermal energy generated during dynamometer tests, such that boot burn-out and boot fatigue are effectively prevented. As shown in FIG. 3, the retainer ring and heat shield element may comprise a single subassembly, heat shield element 160 being mounted to the back of retainer ring 150, and both simultaneously mounted to reduced diameter portions of dual pistons. The present invention finds particular use in the disc brake assemblies of medium and heavy trucks which utilize a dual piston disc brake assembly. FIG. 3 illustrates the unitary subassembly structure of a dual retainer ring 150 having a dual heat shield element 160 mounted to the back thereof, the subassembly for being force fitted onto the reduced diameter portions of two pistons.

The improved heat shield element of the present invention provides a very economical, simply manufactured and assembled heat shield element which effectively protects the flexible boot seal from the high amounts of thermal energy generated during braking application. By protecting the boot seal from deterioration or destruction as a result of high amounts of heat generated during braking, the boot seal remains effectively in place and keeps dirt, water and other contaminants from entering into the bore 14 of caliper 12 so that such material will not damage the phenolic piston or possibly cause piston lock-up and inoperativeness of the disc brake 10. Flexible boot seal 30 of disc brake 10 is an important protective component, and maintaining the integrity of the boot seal is of prime importance in providing a quality disc brake assembly operable for long periods of time without premature wear and deterioration of the component parts.

Although this invention has been described in connection with the illustrated embodiments, it will be obvious to those skilled in the art that various changes may be made in the form, structure, and arrangement of parts without departing from the invention.

I claim:

1. A heat shield for a disc brake assembly having a piston movably carried within a caliper housing bore such that movement of the piston in one direction during braking imparts movement to a friction element which is engageable with a rotating member to convert kinetic energy of the rotation member into thermal energy of the friction element and increasing the temperature of the friction element, the heat shield cooperating with the piston to substantially reduce the thermal energy transferred from the friction element to a boot seal engaging the piston, the piston cooperating with the housing and the friction element to define a cavity for receiving the boot seal and heat shield, said heat shield comprising a retainer ring having a central opening receiving a correspondingly shaped portion of said piston therein, the circumfrence of the central opening being fitted about the correspondingly shaped portion of the piston in order to provide a mounting of said retainer ring upon said piston so that said ring is spaced from said friction element and prevents an end of said boot seal from engaging said friction element, characterized in that said heat shield further comprises a light weight, flexible heat shield element having a center opening coaxial wih said central opening and receiving the piston therein, the heat shield element being disposed between said retainer ring and boot seal in order to provide an insulating material therebetween in order to protect the boot seal from thermal energy dissipated from said friction element, said flexible heat shield element being retained axially in position by said retainer ring.

2. The heat shield in accordance with claim 1, wherein said retainer ring includes a gripping edge which is deflected radially outwardly to fit over said piston.

3. The heat shield in accordance with claim 2, wherein said gripping edge is press fitted to said piston and the heat shield element disposed between said retainer ring and boot seal to prevent engagement of the boot seal with said retainer ring.

4. The heat shield in accordance with claim 1, wherein the retainer ring and flexible heat shield element substantially enclose an enlarged diameter portion of said housing bore, the boot seal being disposed in said in large diameter portion and thermally protected by said heat shield element.

5. The heat shield in accordance with claim 1, wherein said heat shield element comprises a ceramic material.

6. The heat shield in accordance with claim 1, wherein said heat shield element comprises a nonmetallic, flexible heat resistant material.

7. The heat shield in accordance with claim 1, wherein said retainer ring and heat shield element are movably displaced with said piston and permit extension of said boot seal during said movement.

* * * * *